(12) United States Patent
Kim

(10) Patent No.: US 10,634,016 B2
(45) Date of Patent: Apr. 28, 2020

(54) CONTINUOUS VARIABLE VALVE DURATION APPARATUS AND ENGINE PROVIDED WITH THE SAME

(71) Applicants: Hyundai Motor Company, Seoul (KR); Kia Motors Corporation, Seoul (KR)

(72) Inventor: Kyung Mo Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/176,311

(22) Filed: Oct. 31, 2018

(65) Prior Publication Data

US 2019/0353058 A1    Nov. 21, 2019

(30) Foreign Application Priority Data

May 15, 2018 (KR) .................. 10-2018-0055599

(51) Int. Cl.
| | |
|---|---|
| *F01L 1/26* | (2006.01) |
| *F01L 1/053* | (2006.01) |
| *F01L 1/18* | (2006.01) |
| *F01L 1/356* | (2006.01) |

(Continued)

(52) U.S. Cl.
CPC .............. *F01L 1/267* (2013.01); *F01L 1/053* (2013.01); *F01L 1/181* (2013.01); *F01L 1/356* (2013.01); *F01L 13/0015* (2013.01); *F01L 13/0026* (2013.01); *F01L 2001/0476* (2013.01);

(Continued)

(58) Field of Classification Search
CPC . F01L 1/267; F01L 1/053; F01L 1/181; F01L 2001/0535; F01L 13/0026; F01L 13/0015; F01L 1/356; F01L 2013/103; F01L 2001/0473; F01L 2001/0476; F01L 1/46; F01L 2013/0089; F02D 13/0215; F02D 13/0234; F02D 13/0249
USPC ......... 123/90.15, 90.16, 90.17, 90.18, 90.39, 123/90.44
See application file for complete search history.

(56) References Cited

U.S. PATENT DOCUMENTS 5,562,072 A * 10/1996 Stoody, Jr. .............. F01L 1/053
 123/90.27
6,499,454 B2 * 12/2002 Miyazato ............ F01L 13/0015
 123/90.15

(Continued)

*Primary Examiner* — Patrick Hamo
*Assistant Examiner* — Wesley G Harris
(74) *Attorney, Agent, or Firm* — Morgan, Lewis & Bockius LLP

(57) ABSTRACT

A continuous variable valve duration apparatus may include first cam portion including first cam, of which relative phase angle of the first cam is variable, internal bracket transmitting rotation of the camshaft to the first cam portion, control shaft, of which a control gear is mounted thereto, slider housing in which the internal bracket is rotatably inserted, to be movable perpendicular to the camshaft and the slider housing on which a guide wall is formed, rocker shaft, first rocker arm rotatably disposed to the rocker shaft of which a first end portion contacts with the first cam and of which a second end portion is connected to a first valve, moving gear disposed within the guide wall, engaged with the control gear and the moving gear to move the slider housing according to rotation of the control shaft and a controller selectively rotating the control shaft.

19 Claims, 11 Drawing Sheets

(51) Int. Cl.
F01L 13/00 (2006.01)
F01L 1/047 (2006.01)

(52) U.S. Cl.
CPC .............. *F01L 2001/0535* (2013.01); *F01L 2013/0089* (2013.01); *F01L 2013/103* (2013.01)

(56) References Cited

U.S. PATENT DOCUMENTS

2010/0206254 A1\* 8/2010 Inata ................ F01L 13/0015
123/90.16
2016/0153324 A1\* 6/2016 Kwon ................ F01L 13/0015
123/90.16

\* cited by examiner

Phase a  Phase b  Phase c  Phase d

Phase a  Phase b  Phase c  Phase d

CONTINUOUS VARIABLE VALVE DURATION APPARATUS AND ENGINE PROVIDED WITH THE SAME

CROSS-REFERENCE TO RELATED APPLICATION

The present application claims priority to Korean Patent Application No. 10-2018-0055599 filed on May 15, 2018, the entire contents of which is incorporated herein for all purposes by this reference.

BACKGROUND OF THE INVENTION

Field of the Invention

The present invention relates to a continuous variable valve duration apparatus and an engine provided with the same. More particularly, the present invention relates to a continuous variable valve duration apparatus an engine provided with the same which may vary opening duration of a valve according to operation conditions of an engine with a simple construction.

Description Of Related Art

An internal combustion engine generates power by combusting fuel in a combustion chamber in an air media drawn into the chamber. Intake valves are operated by a camshaft to intake the air, and the air is drawn into the combustion chamber while the intake valves are open. Furthermore, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal opening/closing timing of the valves depends on the rotation speed of the engine. To achieve such optimal valve operation depending on the rotation speed of the engine, various researches, such as designing of a plurality of cams and a continuous variable valve lift (CVVL) that can change valve lift according to engine speed, have been undertaken.

Also, to achieve such an optimal valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

Also, research has been undertaken on a continuously variable valve duration (CVVD) apparatus that enables different duration of a valve.

However, malfunction of valves may occur if tolerance of elements of the apparatus is excessive.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a continuous variable valve duration apparatus and an engine provided with the same which may vary the opening duration of a valve according to operation conditions of an engine, with a simple construction.

A continuous variable valve duration apparatus according to various aspects of the present invention may be applied to an SOHC engine to reduce weight of the engine and driving resistance.

A continuous variable valve duration apparatus according to various aspects of the present invention may suppress malfunction of a valve without influence of tolerance of elements.

A continuous variable valve duration apparatus according to an exemplary embodiment of the present invention may include a camshaft, a first cam portion including a first cam, of which the camshaft is inserted therein and of which relative phase angle of the first cam with respect to the camshaft is variable, an internal bracket transmitting rotation of the camshaft to the first cam portion, a control shaft parallel to the camshaft and of which a control gear is mounted thereto, a slider housing in which the internal bracket is rotatably inserted, configured to be movable perpendicular to the camshaft and the slider housing on which a guide wall is formed, a rocker shaft, a first rocker arm rotatably disposed to the rocker shaft of which a first end portion contacts with the first cam and of which a second end portion thereof is connected to a first valve, a moving gear internally disposed within the guide wall, engaged with the control gear and the moving gear configured to move the slider housing according to rotation of the control shaft and a controller selectively rotating the control shaft.

The continuous variable valve duration apparatus may further include a guide shaft mounted to the slider housing and of which a guide thread is formed thereto, and an internal thread engaged with the guide thread may be formed at an internal side of the moving gear, The continuous variable valve duration apparatus may further include a cam cap mounting the camshaft to a cylinder head.

A guide hole may be formed at the slider housing and a guide rod inserted into the guide hole for guiding movement of the slider housing may be mounted to the cam cap.

A control shaft supporter rotatably supporting the control shaft may be mounted to the cam cap.

A rocker shaft supporting portion rotatably supporting the rocker shaft may be formed at the cam cap.

The controller may include a control motor of which a worm is mounted thereto and perpendicular to the control shaft and a worm wheel of which the control shaft is mounted thereto and engaged with the worm.

A first slot and a second slot may be formed at the internal bracket and the continuous variable valve duration system may further include a first slider pin slidably connected to the camshaft and rotatably inserted into the first slot and a second slider pin rotatably inserted into the second slot.

The first slider pin may include a pin body slidably connected to the camshaft along a longitudinal direction thereof and a pin head inserted into the first slot.

The first cam portion may further include an external shaft of which an external slot, the second slider pin is inserted thereto, is formed thereto, the external shaft in which the camshaft is inserted, and the external shaft of which the first cam is connected thereto.

The continuous variable valve duration apparatus may further include a first bridge connected to the second end portion of the first rocker arm, and two first valves may be connected to the first bridge.

The continuous variable valve duration apparatus may further include a second cam portion including a second cam rotating with the camshaft and a second rocker arm rotatably connected to the rocker shaft, of which a first end portion is configured to contact with the second cam and of which a second end portion is connected to a second valve.

The continuous variable valve duration apparatus may further include a second bridge connected to the second end portion of the second rocker arm, and two second valves may be connected to the second bridge.

The first cam portion may further include an external shaft on which an external slot, the second slider pin is inserted thereto, is formed thereto, on which a guide slot is formed along a circumferential direction thereof, into which the camshaft is inserted and the external shaft to which the first cam is connected.

The continuous variable valve duration apparatus may further include a first bridge connected to the second end portion of the first rocker arm, and two first valves may be connected to the first bridge.

The continuous variable valve duration apparatus may further include a second cam portion including a second cam connected to the camshaft through the guide slot and a second rocker arm rotatably connected to the rocker shaft, of which a first end portion contacts with the second cam and of which a second end portion is connected to a second valve.

The continuous variable valve duration apparatus may further include a second bridge connected to the second end portion of the second rocker arm, and two second valves may be connected to the second bridge.

The continuous variable valve duration apparatus may further include a bearing disposed between the internal bracket and the slider housing.

An engine according to an exemplary embodiment of the present invention may be provided with the continuous variable valve duration apparatus.

As described above, a continuous variable valve duration system according to an exemplary embodiment of the present invention may vary an opening duration of a valve according to operation conditions of an engine, with a simple construction.

The continuous variable valve duration system according to an exemplary embodiment of the present invention may be reduced in size and thus an entire height of a valve train may be reduced.

Since the continuous variable valve duration system may be applied to a conventional engine without excessive modification, thus productivity may be enhanced and production cost may be reduced.

Since shaking of a slider housing may be reduced, and thus malfunction of a valve may be suppressed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
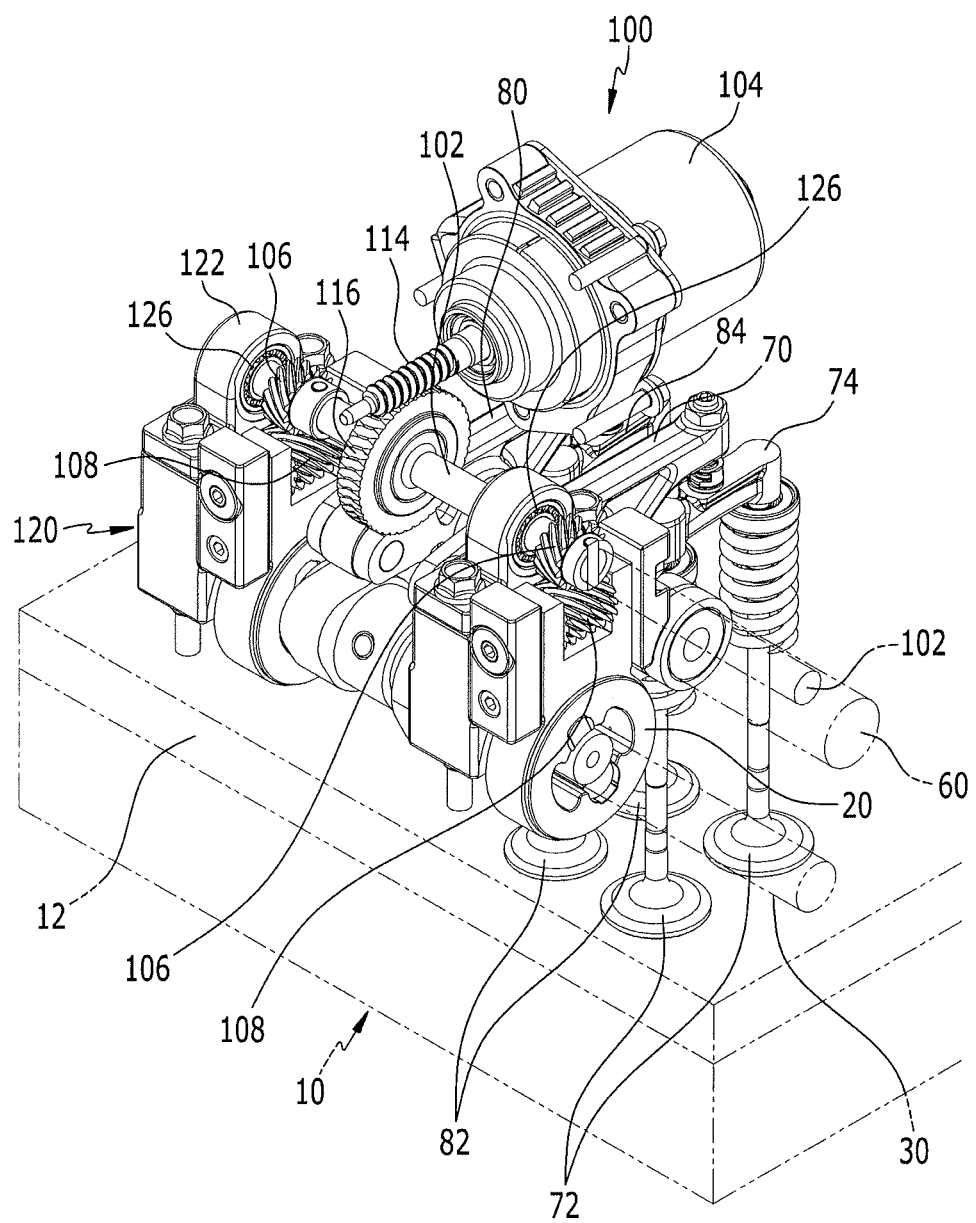
FIG. 1 is a perspective view of an engine provided with a continuous variable valve duration apparatus according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention A part irrelevant to the description will be omitted to clearly describe the present invention, and the same or similar elements will be designated by the same reference numerals throughout the specification.

In the drawings, the thickness of layers, films, panels, regions, etc., are exaggerated for clarity.

Throughout the specification and the claims, unless explicitly described to the contrary, the word "comprise" and variations such as "comprises" or "comprising", will be understood to imply the inclusion of stated elements but not the exclusion of any other elements.

An exemplary embodiment of the present invention will hereinafter be described in detail with reference to the accompanying drawings.

Figure 2:
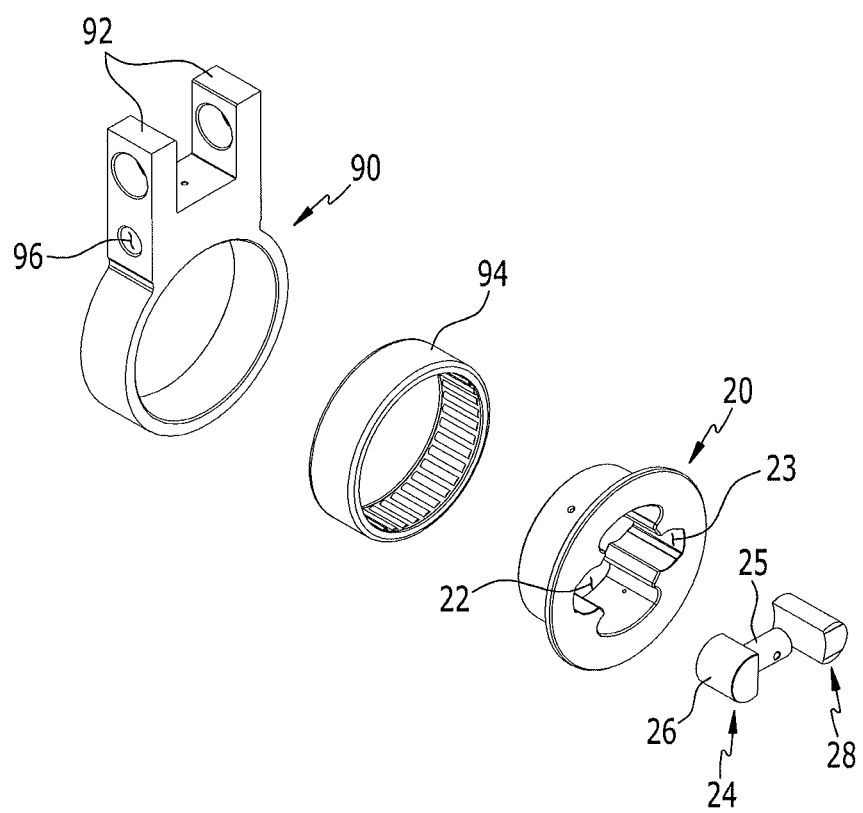
FIG. 2, FIG. 3 and FIG. 4 are partial exploded perspective views of a continuous variable valve duration apparatus according to an exemplary embodiment of the present invention.
Figure 3:
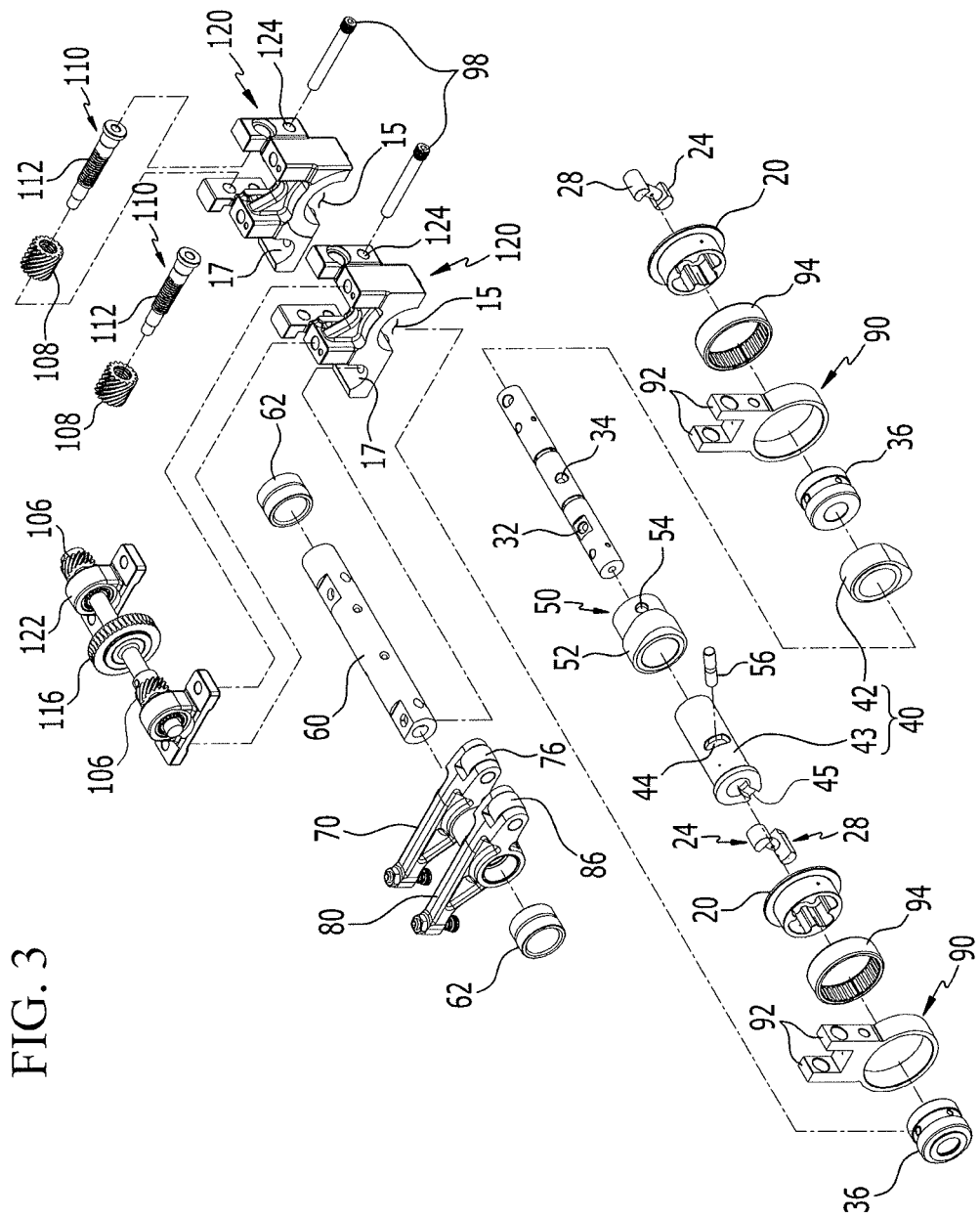
Figure 4:
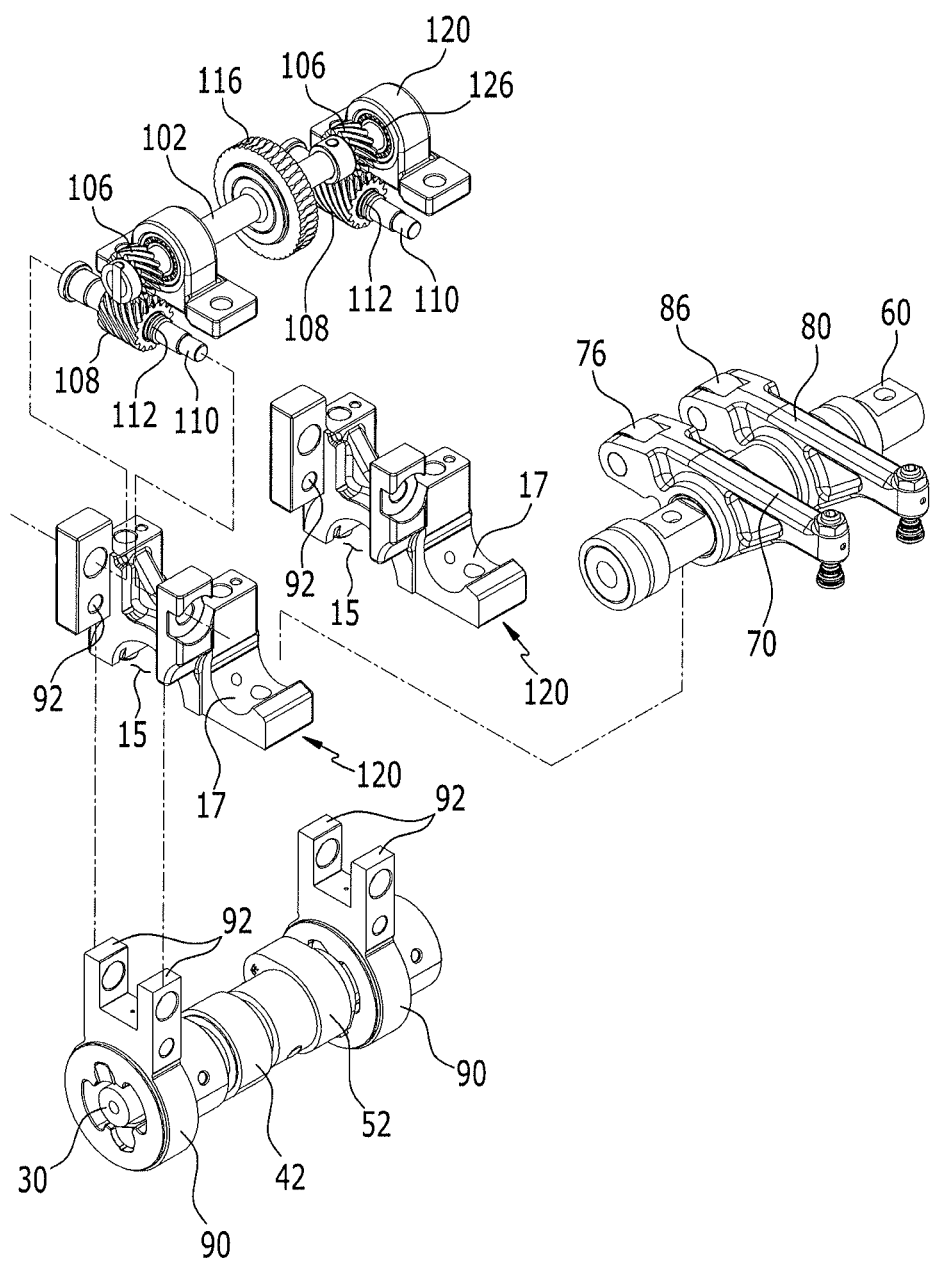

FIG. 1 is a perspective view of an engine provided with a continuous variable valve duration apparatus according to an exemplary embodiment of the present invention and FIG. 2, FIG. 3 and FIG. 4 are partial exploded perspective views of a continuous variable valve duration apparatus according to an exemplary embodiment of the present invention.

Figure 5:
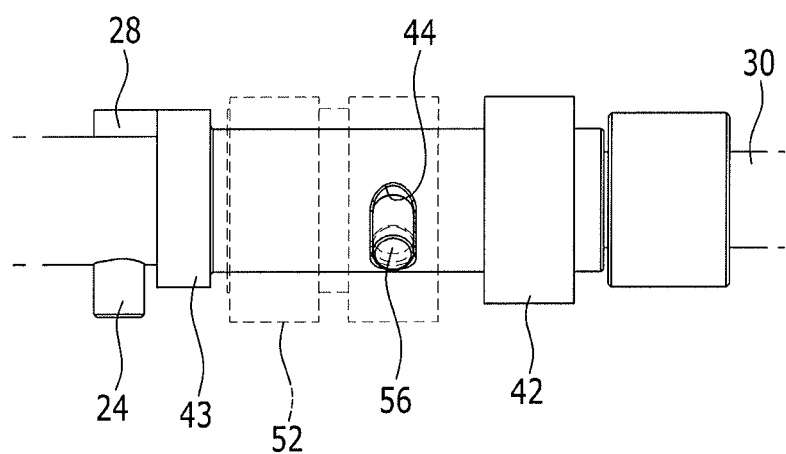
FIG. 5 is a drawing showing a first and a second cam portion of a continuous variable valve duration apparatus according to an exemplary embodiment of the present invention.

FIG. 5 is a drawing showing a first and a second cam portion of a continuous variable valve duration apparatus according to an exemplary embodiment of the present invention.

Referring to FIG. 1 to FIG. 5, an engine 10 according to an exemplary embodiment of the present invention is provided with a continuous variable valve duration apparatus.

The continuous variable valve duration apparatus according to an exemplary embodiment of the present invention includes a camshaft 30, a first cam portion 40 including a first cam 42, of which the camshaft 30 is inserted therein and of which relative phase angle of the first cam 42 with respect to the camshaft 30 is variable, an internal bracket 20 transmitting rotation of the camshaft 30 to the first cam portion 40, a control shaft 102 parallel to the camshaft 30 and of which a control gear 106 is mounted thereto, a slider housing 90 in which the internal bracket 20 is rotatably inserted, and configured to be movable perpendicular to the camshaft 30 and the slider housing 90 on which a guide wall 92 is formed, a rocker shaft 60, a first rocker arm 70 rotatably disposed to the rocker shaft 60 of which a first end portion contacts with the first cam 42 and of which a second end portion is connected to a first valve 72, a moving gear 108 internally disposed within the guide wall 92, engaged with the control gear 106 and the moving gear 108 configured to move the slider housing 90 according to rotation of the control shaft 102 and a controller 100 selectively rotating the control shaft 102.

A guide shaft 110 of which a guide thread 112 is formed thereto is mounted to the slider housing 90 and an internal thread 109 is formed at an internal side of the moving gear 108 and engaged with the guide thread 112.

A cam cap 120 is configured to mount the camshaft 30 to a cylinder head 12.

A camshaft supporting portion 15 is formed at the cam cap 120, a camshaft bearing 36 is mounted to the camshaft 30 and the camshaft bearing 36 is mounted to the camshaft supporting portion 15.

A guide hole 96 is formed at the slider housing 90 and a guide rod 98 inserted into the guide hole 96 for guiding movement of the slider housing 90 is mounted to the cam cap 120. The guide rod 98 may be connected to a rod aperture 124 formed at the cam cap 120.

A control shaft supporter 122 rotatably supporting the control shaft 102 is mounted to the cam cap 120. A bearing 126 may be disposed between the control shaft 102 and the control shaft supporter 122.

A rocker shaft supporting portion 17 rotatably supporting the rocker shaft 60 is formed at the cam cap 120. A rocker shaft bearing 62 is connected to the rocker shaft 30 and the rocker shaft bearing 62 is mounted to the rocker shaft supporting portion 17.

Since the camshaft supporting portion 15, the rod aperture 124 and the rocker shaft supporting portion 17 are formed at the cam cap 120 and the control shaft supporter 122 is mounted thereto, a number of the continuous variable valve duration apparatus may be reduced and scheme of the continuous variable valve duration apparatus may be simplified.

The controller 100 includes a control motor 104 of which a worm 114 is mounted thereto and perpendicular to the control shaft 102 and a worm wheel 116 of which the control shaft 102 is mounted thereto and engaged with the worm 114.

Since the worm 114 and the worm wheel 116 are located between the control shaft 102 and the control motor 104, capacity of the control motor 104 may be reduced.

A first slot 22 and a second slot 23 are formed at the internal bracket 20.

The continuous variable valve duration apparatus further includes a first slider pin 24 slidably connected to the camshaft 30 and rotatably inserted into the first slot 22 and a second slider pin 28 rotatably inserted into the second slot 23.

The first slider pin 24 includes a pin body 25 slidably connected to the camshaft 30 along a longitudinal direction thereof and a pin head 26 inserted into the first slot 22, and a camshaft aperture 32 is formed at the camshaft 30 and the pin body 25 is slidably inserted into the camshaft aperture 32.

The first cam portion 40 further includes an external shaft 43 of which an external slot 45 where the second slider pin 28 is inserted thereto, is formed thereto, the external shaft 43 in which the camshaft 30 is inserted, and the first cam 43 is connected to the external shaft 43

A first roller 76 contacting the first cam 42 is connected to the first end portion of the first rocker arm 70, a first bridge 74 is connected to the second end portion of the first rocker arm 70 and two first valves 72 are connected to the first bridge 74.

The continuous variable valve duration apparatus further includes a second cam portion 50 including a second cam 52 rotating with the camshaft 30 and a second rocker arm 80 rotatably connected to the rocker shaft 60, of which a first end portion contacts with the second cam 52 and of which a second end portion is connected to a second valve 82.

A second roller 86 contacting the second cam 52 is connected to the first end portion of the second rocker arm 80, a second bridge 84 is connected to the second end portion of the second rocker arm 80 and two second valves 82 are connected to the second bridge 80.

A guide slot 44 is formed at the external shaft 43 along circumferential direction and the second cam portion 55 is connected to the camshaft 30 through the guide slot 44.

That is, a cam connecting aperture 34 is formed at the camshaft 30, a cam aperture 54 is formed at the second cam portion 50 and a cam connecting pin 56 is inserted into the cam connecting aperture 34 and the cam aperture 54. and the cam connecting pin 56 is inserted into the guide slot 44 and the guide slot 44 guides relative rotation of the cam connecting pin 56.

A bearing 94 is disposed between the internal bracket 20 and the slider housing 90 configured for rotatably supporting the internal bracket 20.

Figure 6:
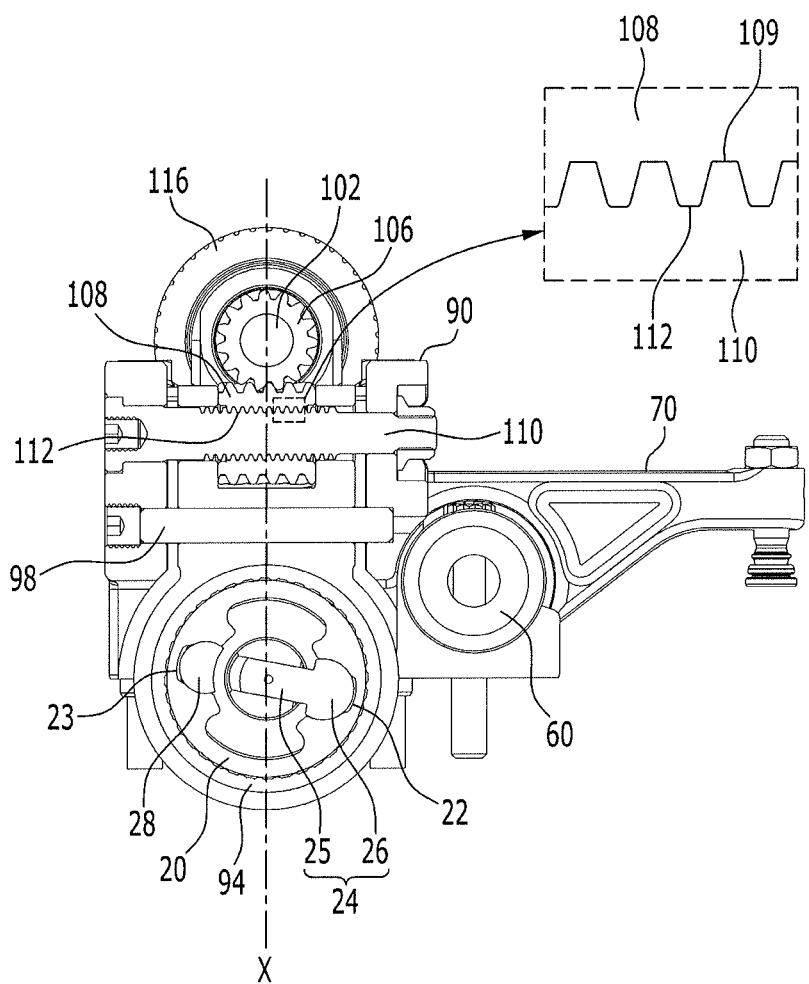
FIG. 6 and FIG. 7 are drawings showing operation of a continuous variable valve duration apparatus according to an exemplary embodiment of the present invention.
Figure 7:
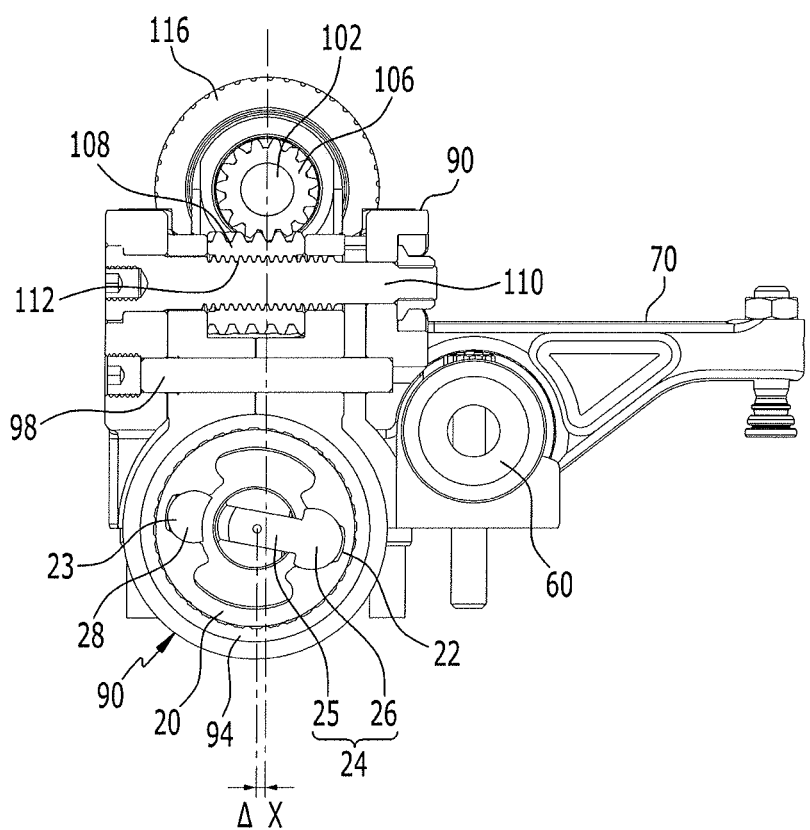
Figure 8:
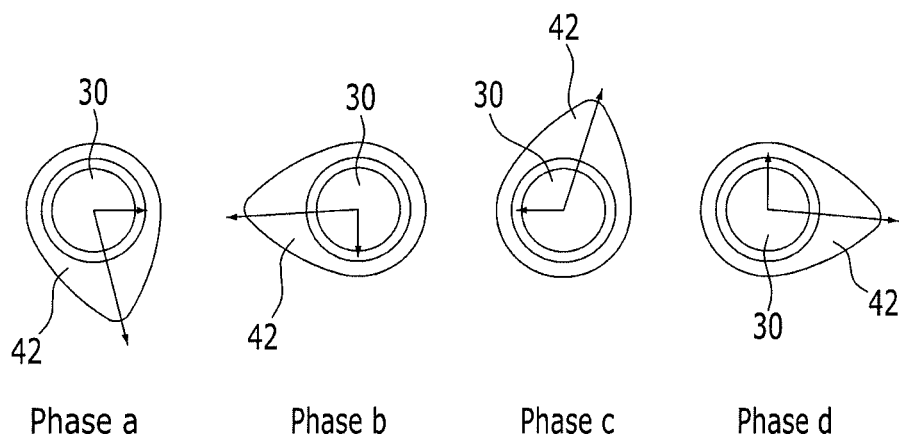
FIG. 8 and FIG. 9 are drawings showing mechanical motions of cams of a continuous variable valve duration apparatus according to an exemplary embodiment of the present invention.
Figure 9:
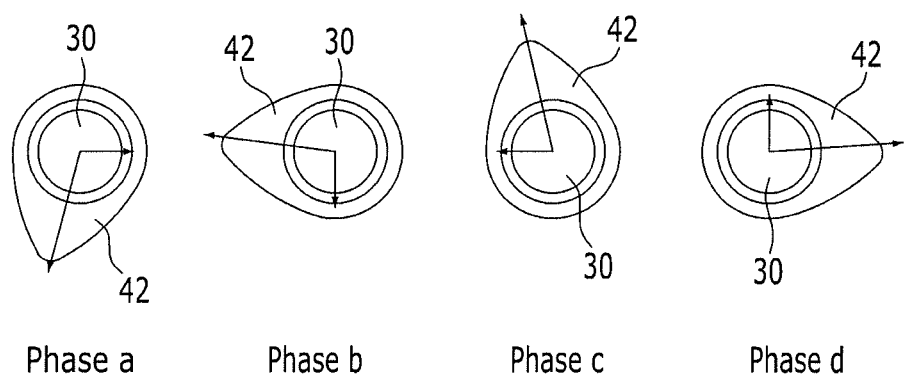

FIG. 6 and FIG. 7 are drawings showing operation of a continuous variable valve duration apparatus according to an exemplary embodiment of the present invention and FIG. 8 and FIG. 9 are drawings showing mechanical motions of cams of a continuous variable valve duration apparatus according to an exemplary embodiment of the present invention.

Referring to FIG. 1 to FIG. 9, operations of the continuous variable valve duration apparatus according to various aspects of the present invention will be discussed.

As shown in FIG. 6, in the case that rotation centers of the camshaft 30 and the internal bracket 20 are coincident, the first cam 42 rotates with the same phase angle of the camshaft 30.

As shown in FIG. 7, when the control portion 100 is operated to rotate the control shaft 102, the control gear 106 rotates the moving gear 108, the moving gear 108 pushes the guide wall 92 and thus the slider housing 90 moves along the guide rod 98.

Since rotation centers of the control gear 106 and the moving gear 108 are perpendicular to each other, shaking or vibration of the slider housing 90 may be suppressed.

The control gear 106 and the moving gear 108 may be gears to transmit rotation perpendicularly. For example, control gear 106 and the moving gear 108 may be screw gears of which formed angle is 45 degrees.

Also, since the guide shaft 110 with the guide thread 112 is engaged with the moving gear 108 with the internal thread 109, and thus shaking or vibration of the slider housing 90 may be suppressed even though the moving gear 108 rotates.

The guide thread 112 and the internal thread 109 may be shaped as a trapezoid shape and the moving gear 108 may rotate to move along the guide shaft 110.

Since the control gear 106 is engaged with the moving gear 108 and the guide shaft 110 is engaged with the moving gear 108 so that malfunction or abnormal operation of valves in controlling the valve duration may be suppressed.

When a rotation center X of the camshaft 30 and the internal bracket 20 are not coincident according to operation of the control portion 100 as denoted as "Δ" in the FIG. 7, rotation speed of the first cam 42 with respect to rotation speed of the camshaft 30 is changed.

That is, since the first slider pin 24 is slidable along longitudinal direction thereof with respect to the camshaft 30, the pin head 26 is rotatable within the first slot 22, the second slider pin 28 is rotatable within the second slot 23, and the second slider pin 28 is slidable within the external slot 45, such that the rotation speed of the first cam 42 with respect to the rotation speed of the camshaft 30 is changed when the rotation centers of the camshaft 30 and the internal bracket 20 are not coincident.

When the rotation center of the internal bracket 20 with respect to the camshaft 30 moves to one direction thereof, the rotation speed of the first cam 42 is relatively faster than rotation speed of the camshaft 30 from phase a to phase b and from phase b to phase c, then the rotation speed of the first cam 42 is relatively slower than rotation speed of the camshaft 30 from phase c to phase d and from phase d to phase a as shown in FIG. 8.

When the rotation center of the internal bracket 20 with respect to the camshaft 30 moves to the other direction according to the operation of the control portion 100, the rotation speed of the first cam 42 is relatively slower than rotation speed of the camshaft 30 from phase a to phase b and from phase b to phase c, then the rotation speed of the first cam 42 is relatively faster than rotation speed of the camshaft 30 from phase c to phase d and from phase d to phase a as shown in FIG. 9.

According to the relative position of the internal bracket 20, timing of the first cam 42 to push the first roller 76 which is the timing of the first valve 72 is opened or closed is changed.

Figure 10:
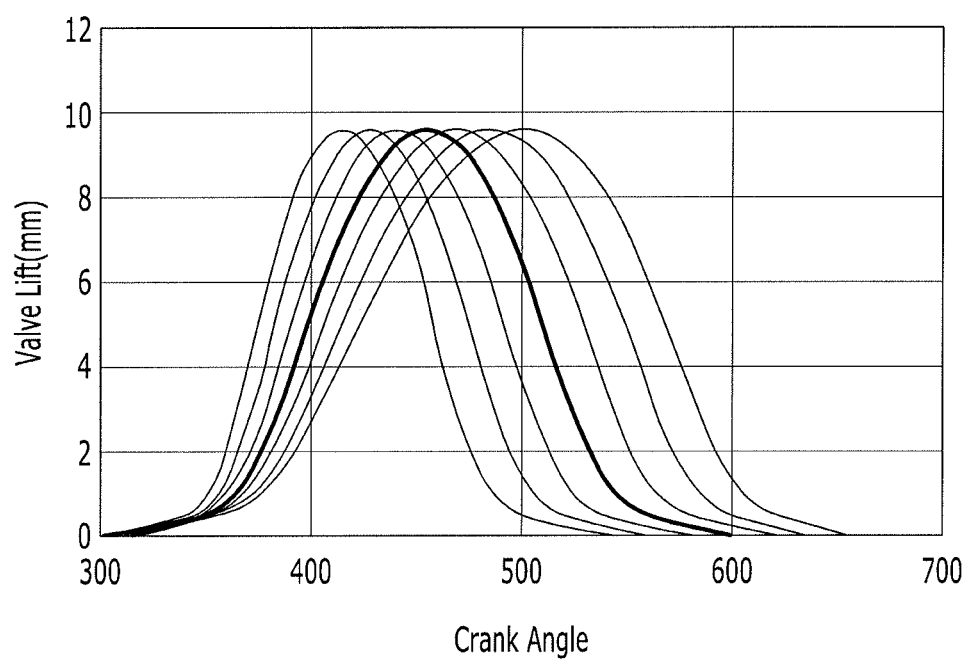
FIG. 10, FIG. 11, and FIG. 12 are graphs of a valve profile of a continuous variable valve duration apparatus according to an exemplary embodiment of the present invention.
Figure 11:
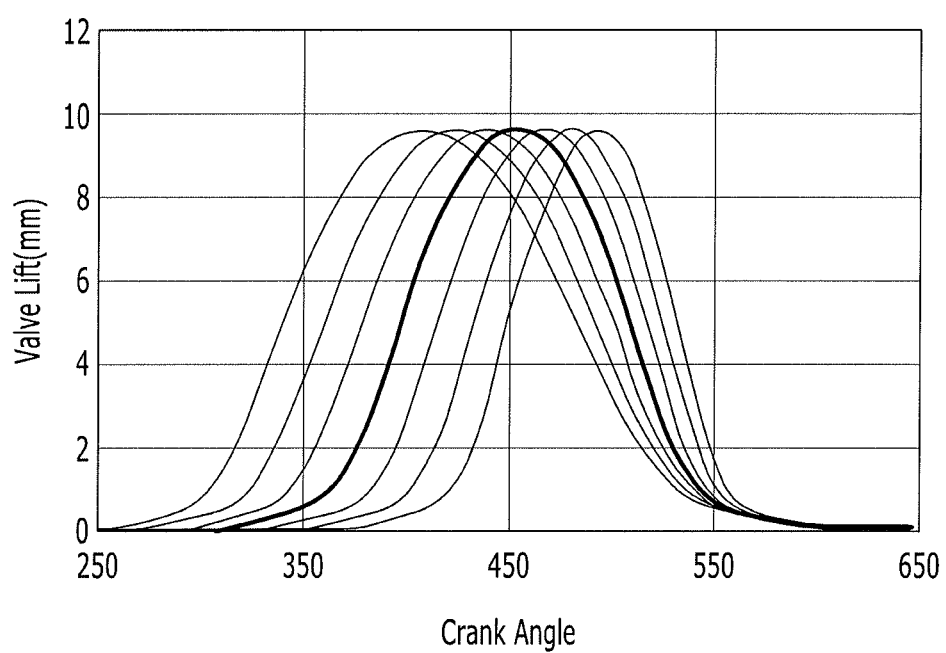
Figure 12:
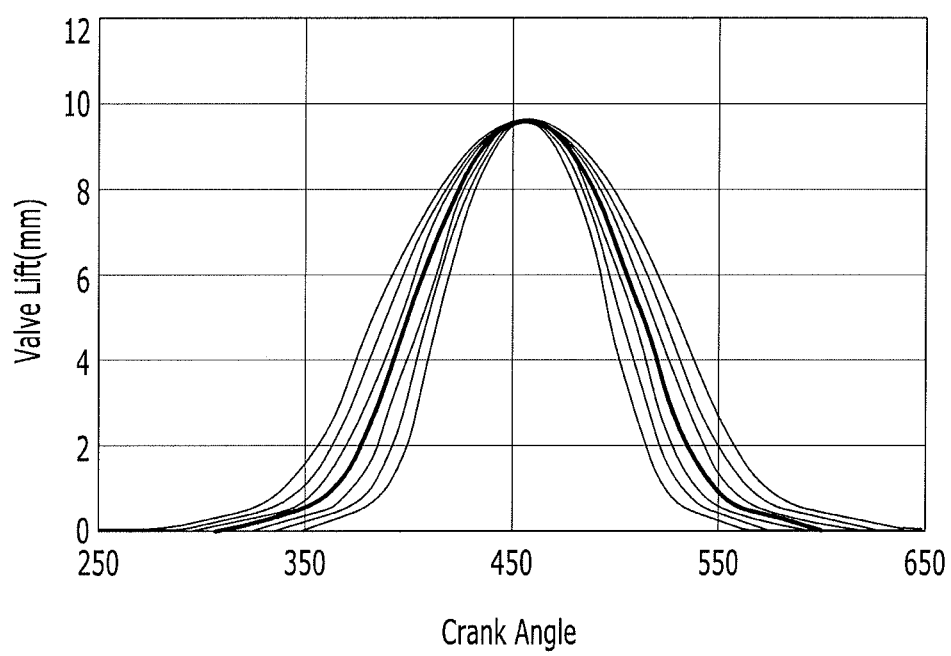

FIG. 10, FIG. 11, and FIG. 12 are graphs of a valve profile of a continuous variable valve duration apparatus according to an exemplary embodiment of the present invention.

The continuous variable valve duration system according to an exemplary embodiment of the present invention may perform various valve profiles according to contacting positions of the first cam 42 and the first roller 76, mounting angle of the first cam 42 and the first roller 76 and the like.

As shown in FIG. 10, opening time of the first valve 72 may be fixed while closing time of the first valve 72 is changed. Or the opening time of the first valve 72 may be changed while the closing time of the first valve 72 is fixed as shown in FIG. 11.

As shown in FIG. 12, peak time of the first valve 72 may be fixed while duration of the first valve 72 is changed.

As described above, a continuous variable valve duration system according to an exemplary embodiment of the present invention may vary an opening duration of a valve according to operation conditions of an engine, with a simple construction.

The continuous variable valve duration system according to an exemplary embodiment of the present invention may be reduced in size and thus an entire height of a valve train may be reduced.

Since the continuous variable valve duration system may be applied to a conventional engine without excessive modification, thus productivity may be enhanced and production cost may be reduced.

Since shaking or vibration of the slider housing may be reduced, and thus malfunction or abnormal operation of valves may be suppressed.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A continuously variable valve duration (CVVD) apparatus comprising:
  a camshaft;
  a first cam portion including a first cam into which the camshaft is inserted, wherein a relative phase angle of the first cam with respect to the camshaft is variable;
  an internal bracket engaged with the camshaft and the first cam portion and transmitting a rotation of the camshaft to the first cam portion;
  a control shaft in parallel to the camshaft, wherein a control gear is mounted to the control shaft;
  a slider housing into which the internal bracket is rotatably inserted, wherein the internal bracket is configured to move perpendicular to the camshaft, and wherein a guide wall is formed in the slider housing;
  a rocker shaft;
  a first rocker arm rotatably disposed to the rocker shaft, wherein a first end portion of the first rocker arm contacts with the first cam and a second end portion of the first rocker arm is connected to a first valve;
  a moving gear internally disposed within the guide wall and engaged with the control gear, wherein the moving gear is configured to move the slider housing according to a rotation of the control shaft; and
  a controller engaged with the control shaft and selectively rotating the control shaft.

2. The CVVD apparatus of claim 1, further including:
a guide shaft rotatably mounted to the slider housing, wherein the guide shaft includes a guide thread, and
wherein an internal thread is formed at an internal side of the moving gear and engaged with the guide thread of the guide shaft.

3. The CVVD apparatus of claim 2, further including a cam cap mounted to a cylinder head, wherein the camshaft is rotatably mounted to the cam cap.

4. The CVVD apparatus of claim 3,
wherein a guide hole is formed at the slider housing; and
wherein a guide rod inserted into the guide hole for guiding a movement of the slider housing is mounted to the cam cap.

5. The CVVD apparatus of claim 3, wherein a control shaft supporter rotatably supporting the control shaft is mounted to the cam cap.

6. The CVVD apparatus of claim 3, wherein a rocker shaft supporting portion rotatably supporting the rocker shaft is formed at the cam cap.

7. The CVVD apparatus of claim 1, wherein the controller includes:
a control motor including a worm, wherein the worm is mounted perpendicular to the control shaft; and
a worm wheel, wherein the worm wheel is fixedly mounted to the control shaft and is engaged with the worm.

8. The CVVD apparatus of claim 1, further includes:
a first slot and a second slot which are formed at the internal bracket;
a first slider pin slidably connected to the camshaft and rotatably inserted into the first slot; and
a second slider pin rotatably inserted into the second slot, wherein the first slider pin and the second slider pin are connected to each other.

9. The CVVD apparatus of claim 8, wherein the first slider pin includes:
a pin body slidably connected to the camshaft along a longitudinal direction of the camshaft; and
a pin head inserted into the first slot.

10. The CVVD apparatus of claim 8,
wherein the first cam portion further includes an external shaft having an external slot, wherein the second slider pin is inserted into the external slot,
wherein the camshaft is inserted into the external shaft, and
wherein the first cam is mounted on the external shaft.

11. The CVVD apparatus of claim 10,
wherein a first bridge is connected to the second end portion of the first rocker arm, and
wherein two first valves including the first valve are connected to the first bridge.

12. The CVVD apparatus of claim 10, further including:
a second cam portion including a second cam rotating with the camshaft; and
a second rocker arm rotatably connected to the rocker shaft,
wherein a first end portion of the second rocker arm is configured to contact with the second cam and a second end portion of the second rocker arm is connected to a second valve.

13. The CVVD apparatus of claim 12, further including:
a second bridge connected to the second end portion of the second rocker arm,
wherein two second valves including the second valve are connected to the second bridge.

14. The CVVD apparatus of claim 8,
wherein the first cam portion further includes an external shaft having an external slot, wherein the second slider pin is inserted into the external slot,
wherein the external shaft includes a guide slot formed along a circumferential direction of the external shaft,
wherein the camshaft is inserted into the external shaft, and
wherein the first cam is mounted on the external shaft.

15. The CVVD apparatus of claim 14, further including:
a first bridge connected to the second end portion of the first rocker arm,
wherein two first valves including the first valve are connected to the first bridge.

16. The CVVD apparatus of claim 14, further including:
a second cam portion including a second cam connected to the camshaft through the guide slot; and
a second rocker arm rotatably connected to the rocker shaft,
wherein a first end portion of the second rocker arm contacts with the second cam and a second end portion of the second rocker arm is connected to a second valve.

17. The CVVD apparatus of claim 16, further including:
a second bridge connected to the second end portion of the second rocker arm,
wherein two second valves including the second valve are connected to the second bridge.

18. The CVVD apparatus of claim 1, further including:
a bearing disposed between the internal bracket and the slider housing.

19. An engine provided with the CVVD apparatus of claim 1.

* * * * *